Sept. 30, 1969  A. L. DE HAAN  3,469,878

APPARATUS FOR SETTING CORNER IRONS

Original Filed June 12, 1967

ALVIE L. DEHAAN
INVENTOR

BY
BUCKHORN, BLORE, KLARQUIST & SPARKMAN
ATTORNEYS

United States Patent Office 3,469,878
Patented Sept. 30, 1969

3,469,878
APPARATUS FOR SETTING CORNER IRONS
Alvie L. De Haan, 10841 SW. 63rd St.,
Portland, Oreg. 97219
Original application June 12, 1967, Ser. No. 645,449, now Patent No. 3,424,077, dated Jan. 28, 1969. Divided and this application Jan. 3, 1969, Ser. No. 788,734
Int. Cl. A47f 13/06
U.S. Cl. 294—19       3 Claims

ABSTRACT OF THE DISCLOSURE

A tool for installing corner irons on the edge of a load of lumber or plywood comprising an extensible handle and a slotted holder mounted on one end thereof, the holder having a longitudinal axis disposed at an angle to the longitudinal axis of the handle. A corner iron inserted in the slotted holder is raised from the ground to a position in which its horizontal leg can rest on top of the edge of the load and is maintained in position underneath the transversely-extending restraining cable used to hold the load in place until the cable is tightened, thereby to maintain the corner iron protectively in place on the edge of the load.

CROSS-REFERENCE TO RELATED APPLICATION

This application is a division of my copending application, Ser. No. 645,449, filed June 12, 1967, for a Method for Setting Corner Irons, now Patent No. 3,424,077, Jan. 28, 1969.

BACKGROUND OF THE INVENTION

This invention relates to apparatus for installing corner irons on the edge of a load of lumber or plywood and, more particularly, to apparatus for installing corner irons such that climbing up on top of the load is rendered unnecessary.

Lumber and plywood when hauled on truck trailers may be stacked as high as 13 feet 6 inches. A load of this magnitude naturally is very heavy and is fastened to the trailer bed using steel cables which extend transversely around the load, the cables being tightened by means of a winch or other similar mechanism attached to the trailer. The cable tension necessary to maintain such a load in place would damage the material at the corners of the load unless some protection were provided. In order to prevent such damage, corner irons have been used to protect the load.

The correct placement of these corner irons has posed a difficult problem in the past. Usually the driver of the truck has had to climb up on top of the load and place the corner irons in position by hand underneath each of the transversely-extending steel cables. The driver has then had to climb down and tighten the cables by means of the winch. Climbing up on a 13-foot 6-inch high load is obviously a dangerous procedure. Furthermore, since the cables are tightened from a position on the ground, the corner irons frequently become displaced before the correct tension can be applied to the cables, thereby necessitating an additional mounting of the load and a re-setting of the irons. The placement of the irons is thus seen to have been a time-consuming job as well as a hazardous one. The present invention is designed to render the placement of corner irons more precise, as well as to obviate the inherently unsafe procedures heretofore required, thereby to eliminate a needless accident risk.

SUMMARY OF THE INVENTION

The apparatus of the present invention comprises a tool which can be used to install corner irons on a load of lumber or plywood from a position on the ground. As such, the tool comprises a telescoping handle and a holder mounted on one end of the handle, the holder being slotted to seat the vertical leg of a corner iron. The holder comprises a shelf having a longitudinal axis disposed at an angle to the longitudinal axis of the handle and a pair of retaining plates extending parallel to the shelf and disposed therefrom a distance greater than the thickness of the vertical leg of the corner iron, so that the vertical leg may be seated between the shelf and the retaining plates as the corner iron is raised by the extensible handle.

The method of the present invention comprises inserting the vertical leg of the generally L-shaped corner iron in a slotted holder disposed on the end of an extensible handle, raising the corner iron by means of the extensible handle to a position in which the horizontal leg can rest on the top of the edge of a load of lumber or plywood, moving the corner iron by means of the extensible handle longitudinally of the load to a position underneath a transversely extending restraining cable loosely wrapped around the load and adapted to being tightened down around the load to hold both the load and the corner iron in place, lowering the extensible handle to free the vertical leg of the corner iron from the slotted holder while maintaining hand tension on the cable, and finally tightening the restraining cable down over the corner iron and around the load to maintain the corner iron protectively in place on the edge of the load.

The object of the invention is to make it possible to install corner irons on the edge of a load of lumber or plywood in a manner that will be more safe than has been heretofore known.

A further object of the invention is to install corner irons on the edge of a load of lumber or plywood in a less time-consuming and more efficient manner than has been heretofore known.

A still further object of the present invention is to make it possible to install corner irons on the edge of a load of lumber or plywood in a manner that will render the positioning of said corner irons more precise than has been heretofore known.

A still further object of the present invention is to make it possible to install corner irons on the edge of a load of lumber or plywood in a manner that will prevent the corner irons from being displaced from underneath the restraining cable extending transversely around the load of lumber or plywood while the cable is being tightened down around the load.

DESCRIPTION OF THE PREFERRED EMBODIMENT

Figure 1:
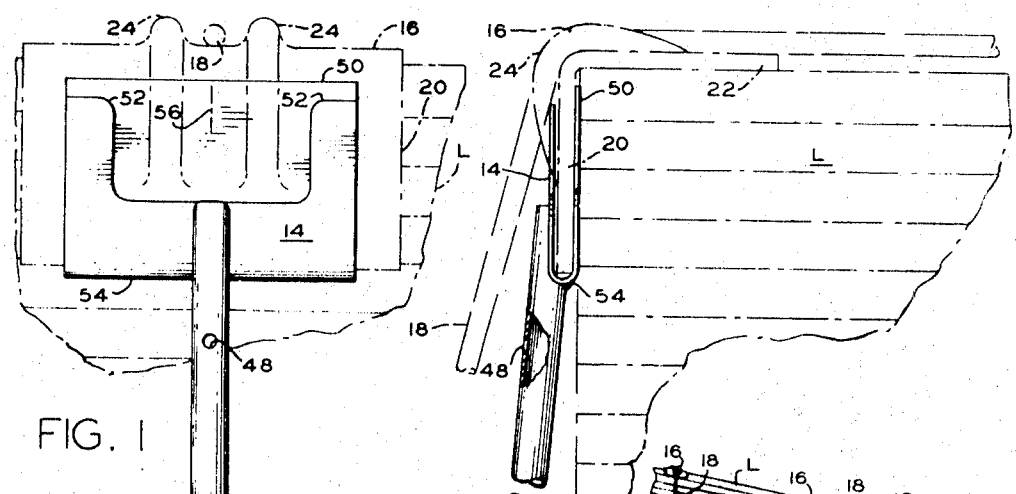
FIG. 1 is a front elevational view with parts broken away of the tool of the present invention, illustrated with the vertical leg of a corner iron seated in the slotted holder.
Figure 2:
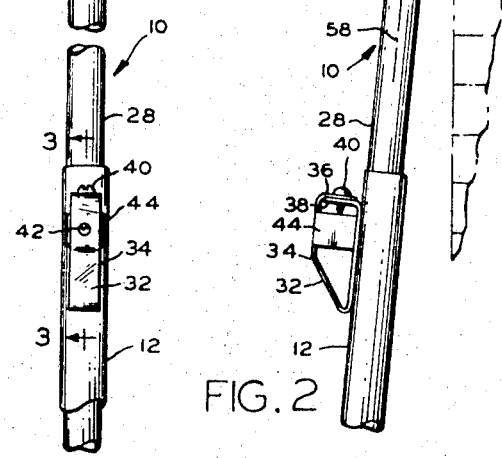
FIG. 2 is a side elevational view with parts broken away of the tool illustrated in FIG. 1.
Figure 4:
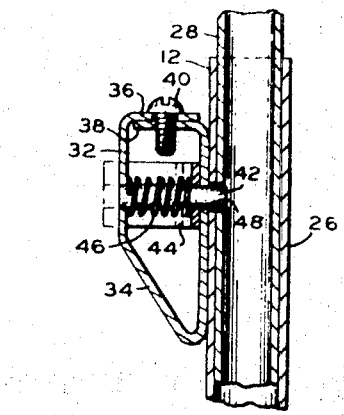
FIG. 4 is a view showing how the tool of the present invention is used to place a corner iron in position on a load of lumber or plywood.

Referring to the drawings and particularly to FIGS. 1 and 2, the tool 10 of the present invention comprises a telescoping handle 12 on one end of which is mounted a slotted holder 14 which is designed to accommodate the vertical leg of a standard corner iron 16 to raise the same into position on the edge of a load of lumber or plywood L, thereby to protect the edges of the load from damage by a cable 18.

Lumber and plywood when hauled on truck trailers is often stacked to a height of 13 feet 6 inches, which is as high as the law will permit. The load L is fastened to the trailer bed using transversely-extending steel cables 18 which are tightened by a winch (not shown) to a high tension. Cable 18 would damage the lumber at the corners of the load unless some protection were provided. Corner irons 16 are used to prevent such damage.

Corner iron 16 is typical of those used for this purpose and its comprises a vertical leg 20, which protects the side of the corner of the load L, and a horizontal leg 22 which protects the top of the corner of the load L. Two integral cable guides 24 extend from horizontal leg 22 around to vertical leg 20 to accommodate cable 18 therebetween and prevent the latter from shifting with respect to the corner iron during transportation of load L.

Handle 12 comprises an exterior metal tubular member 26 interiorly of which is positioned another telescoping metal tubular member 28. Member 28 is extensible with respect to member 26 so that when member 28 is in its fully-extended position, handle 12 may achieve a length of approximately six feet. A rubber or plastic handgrip 30 is received on the lower end of exterior member 26 to facilitate gripping of the tool 10 by an operator.

Figure 3:
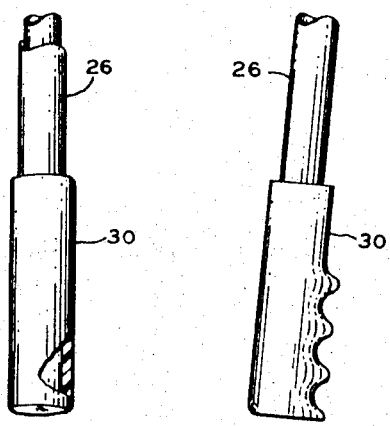
FIG. 3 is a sectional view taken on line 3—3 of FIG. 1.

As shown in FIG. 3, a catch mechanism 32 is welded to the upper end of exterior member 26 to retain interior member 28 in any desired extended position with respect to member 26. Catch mechanism 32 comprises a metal frame 34 having overlapping horizontal members 36 and 38 attached together by a screw 40. A plunger 42 attached to a channel member 44 is supported by frame 34 and urged toward interior tubular member 28 by a circumscribing spring 46 retained between frame 34 and channel 44. Plunger 42 is adapted to be selectively received within any one of a plurality of longitudinally spaced holes 48 drilled in member 28, thereby to maintain member 28 in any desired extended position with respect to member 26. Translation of channel member 44 radially outwardly compresses spring 46 and permits plunger 42 to be retracted from a hole 48, thereby to permit member 28 to be moved with respect to member 26. The retracted position of plunger 42 and channel 44 is shown in the dotted lines in FIG. 3.

Holder 14 is mounted on the extensible end of member 28 as shown in FIGS. 1 and 2. Holder 14 comprises a shelf 50 and a pair of retaining plates 52 joined together by a U-shaped base 54 in which vertical leg 20 of corner iron 16 may be seated. Retaining plates 52 extend parallel to shelf 50 and are disposed therefrom a distance slightly greater than the thickness of corner iron 16, so that vertical leg 20 thereof can be seated within the slotted structure thereby created.

The longitudinal axis 56 of shelf 50 makes a slight angle with respect to the longitudinal axis 58 of handle 12 so that when tool 10 is placing a corner iron 16 in position on the edge of a load of lumber, handle 12 will clear the side of load L, thereby to make convenient installation of corner iron 16 possible. The pair of retaining plates 52 are also separated transversely of the tool a distance greater than the distance between cable guides 24 on corner irons 16, thereby to accommodate said cable guides between retaining plates 52 without interference.

The method of operation of tool 10 and the method of the present invention is as follows: When an operator desires to place a corner iron 16 in position on the edge of a load of lumber or plywood L to protect the same from damage by a restraining cable 18, vertical leg 20 of corner iron 16 is first inserted in slotted holder 14 between shelf 50 and retaining plates 52. Channel member 44 is pulled radially outwardly, retracting plunger 42, and thereby permitting member 23 to be extended with respect to member 26 a distance sufficient to permit horizontal leg 22 of corner iron 16 to rest on the top of the edge of load L.

Corner iron 16 is then moved by means of handle 12 longitudinally of load L to a position underneath a transversely-extending cable 18 with cable guides 24 being disposed one on either side of cable 18. Cable 18 at this point is only loosely wrapped around load L, although the end thereof is inserted in the winch such that cable 18 can be tightened down around load L to hold both the load and corner iron 16 in place.

The operator maintains hand tension on cable 18 once corner iron 16 is in the position above described and then lowers tool 10, thereby to free vertical leg 20 from slotted holder 14. With corner iron 16 thus in place underneath restraining cable 18, tension is then applied to cable 18 by means of the winch, to tighten cable 18 down around corner iron 16, in between cable guides 24, and around load L. This then serves to maintain corner iron 16 protectively in place on the edge of load L.

It is seen that the method of this invention permits corner irons 16 to be installed on the edge of load L in a safe and efficient manner. The method further renders the positioning of a corner iron more precise than was the case with prior methods, and the corner irons are not subject to being displaced from underneath cable 18 while the latter is being tightened down around the load.

Various modifications and changes in the invention are contemplated and obviously may be resorted to without departing from the spirit and scope of the invention as hereinafter defined by the following appended claims.

I claim:

1. A tool for installing a corner iron from the ground on the edge of a load of lumber or plywood or the like, said corner iron being generally L-shaped and having a vertical leg to protect the side of the edge of said load, a horizontal leg to protect the top of the edge of said load, and a pair of cable guides extending outwardly of said vertical and horizontal legs, comprising:

a handle; and a holder mounted on one end of said handle, said holder having a shelf having a longitudinal axis disposed at an angle to the longitudinal axis of said handle, and a pair of retaining plates extending parallel to said shelf and disposed therefrom a distance greater than the thickness of said vertical leg of said corner iron, said retaining plates being separated transversely of said tool a distance greater than the distance between the extremities of said pair of cable guides to accommodate said pair of cable guides between said plates, said shelf and said retaining plates being adapted to seat said vertical leg of said corner iron between them, whereby said corner iron can be raised by said vertical leg thereof and placed with its horizontal leg on top of said edge of said load, said handle clearing the side of said load.

2. A tool as described in claim 1, further comprising: an exterior tubular handle;

a telescoping interior member received within said exterior handle, one end of said interior member being extensible with respect to said exterior handle, said holder being mounted on said extensible one end of said interior member; and means to maintain said interior member in a desired extended position with respect to said exterior handle.

3. A tool as described in claim 2, further comprising a tubular interior member provided with a plurality of longitudinally spaced holes therein, and a spring biased plunger mounted on said exterior tubular handle and adapted selectively to enter said holes in said interior member to maintain said interior member in a desired extended position with respect to said exterior handle.

References Cited

UNITED STATES PATENTS

| | | | |
|---|---|---|---|
| 1,254,925 | 1/1918 | Morse | 294—19 |
| 1,258,309 | 3/1918 | Doncher et al. | 294—19 |
| 2,539,031 | 1/1951 | Pidgeon | 294—19 |

ANDRES H. NIELSEN, Primary Examiner